UNITED STATES PATENT OFFICE.

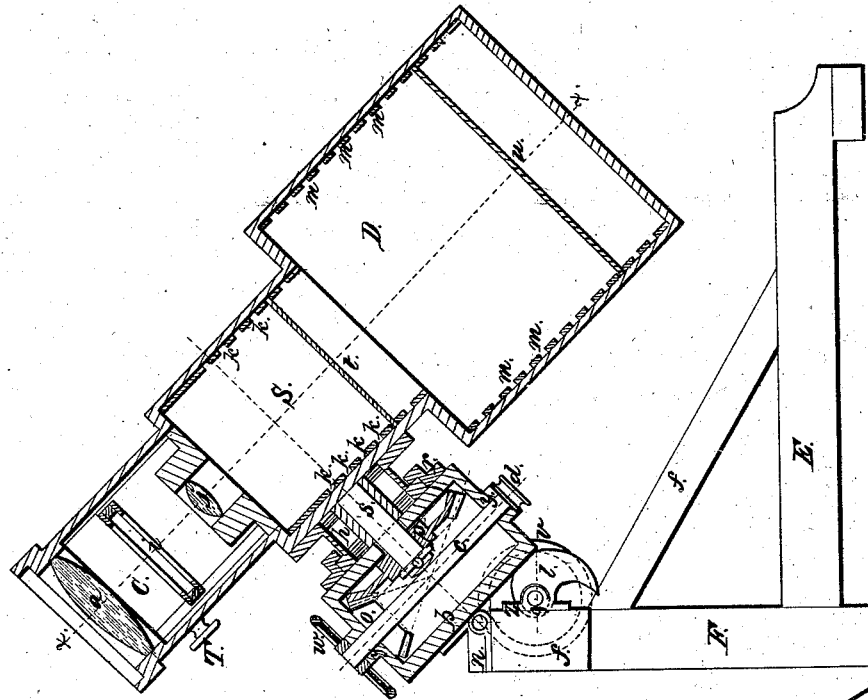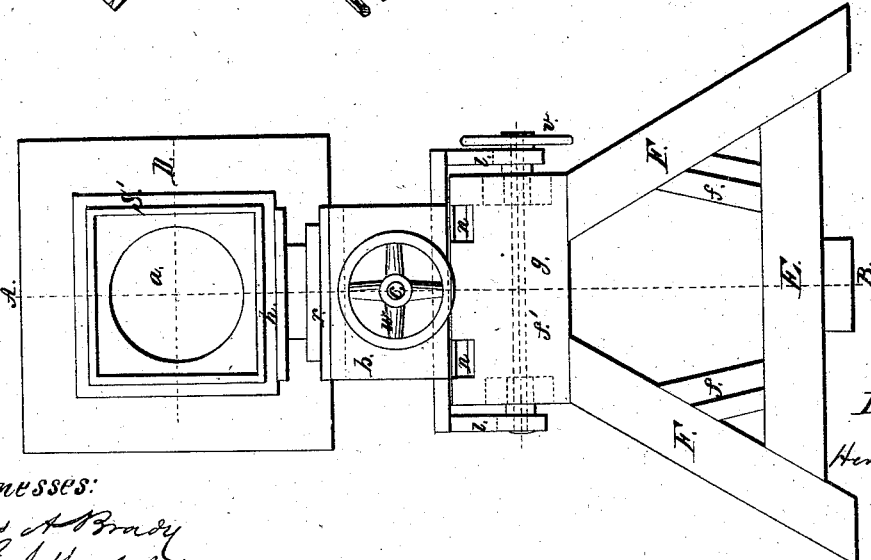

HERMAN ROETTGER, OF PHILADELPHIA, PENNSYLVANIA.

SOLAR CAMERA.

Specification forming part of Letters Patent No. 47,862, dated May 23, 1865.

*To all whom it may concern:*

Be it known that I, HERMAN ROETTGER, of Philadelphia, in the county of Philadelphia and State of Pennsylvania, have invented a new and Improved Solar Camera; and I do declare that the following is a full and exact description thereof, reference being had to the accompanying drawings, and to the letters of reference marked thereon, in which—

Figure 1 represents a front elevation of my improved camera and stand with the camera placed in a horizontal position. Fig. 2 is a vertical section of the same, taken in the line A B of Fig. 1, with the camera placed at an angle of about forty-five degrees.

The nature of my invention consists in a novel arrangement of a cam by which the axis of the camera can be adjusted vertically to any angle with the horizon, and of a set of bevel-gear by which the same may be rotated in a plane at right angles thereto, so that the camera may be so adjusted as to be easily kept with its axis toward the sun, and made to follow its (apparent) movement through the heavens by simply turning a crank or hand-wheel.

It also consists in a novel arrangement of one or more series of parallel grooves for adjusting the sensitized paper at different distances from the object glass, according to the amount of enlargement required, thus admitting of the camera being constructed without the usual bellows or sliding box for effecting such adjustment.

To enable others skilled in the art to make and use my invention, I will proceed to describe its construction and operation.

In solar cameras it is necessary to provide some means by which to keep the sunlight always passing through the lenses in the direction of their axes. This has formerly been done by having a reflector adjusted by a ball-and-socket joint to be moved by hand from time to time, requiring much attention on the part of the photographer besides producing imperfect results. To obviate this difficulty I dispense with reflectors entirely and cause the camera itself to point directly toward the sun, and to move so as to readily follow it in its apparent motion through the heavens by means of devices which I will now describe.

I construct my camera-stand with a base, E, of triangular or other form, from which rise two firm standards, F F, braced in a substantial manner by braces $f\ f$. Across the top ends of the standards F F, I form a cross-piece, $f'$, to which I connect, by hinges $n\ n$, a frame or rectangular gear-box, $b$, provided with bearings $y\ y$ for a shaft, $c$, both ends of which project beyond the bearings. To the outer end of this shaft is fixed a hand-wheel, $w$, and to the inner end a band-wheel, $d$. Within the gear case or box $b$, and upon the shaft $c$, is secured the bevel-pinion $o$, which gears into the bevel-wheel $p$, attached to a short shaft, $s$, passing up through a sleeve, $h$, formed on the upper side of the gear-case $b$ and firmly attached to the under side of the camera-box S. Immediately beneath the hinges $n\ n$ is a shaft, $g$, supported in bearings $z$, attached to the inner side of the cross-piece $f'$. Each end of this shaft is provided with a cam, $l$, which cams have bearings upon the under side of the gear-case $b$ in the rear of its center of motion, (the hinges $n\ n$,) so that when the shaft $g$ is rotated by the hand-wheel $v$ the angle of elevation of the camera is changed to any degree between a horizontal position and one more or less vertical, according to the position required by the inclination of the sun.

I construct my camera with the large convex lens $a$ in front to condense the sunlight upon a small negative to be placed in a sliding frame, $i$, between the condensing-lens $a$ and the object-glass $j$, all in the manner usual in solar cameras.

The tube C is attached to a box, S, provided with a series of slide-grooves, $k\ k$, below and a corresponding series above, into which slides a frame or panel, $t$, upon which frame or panel is to be stretched the sensitized paper.

Attached to the box or chamber S is another large chamber, D, provided with grooves $m\ m$ similar to those in the chamber S, and also with a sliding frame or panel, $u$, to carry the sensitized paper.

It will be readily understood that when small or moderate-sized pictures are required, that the chamber S only will be used; but when larger pictures are to be made the sliding panel $t$ is to be removed and the panel $u$ in the large chamber D employed, and that by adjusting the panels in the different grooves ($k$ or $m$) all the intermediate sizes from the smallest to the largest can be readily produced. The camera represented in the drawings admits of eighteen different sizes of enlargement from the same negative, forming a regular series, from the smallest to the largest. This number may be increased or diminished, according to the requirements of the trade. This arrangement of grooves entirely obviates the necessity of a bellows or a sliding connection between the object-glass and the image, and consequently renders the camera much more secure from cracks or openings as well as stronger, more durable, and less expensive.

The operation of my camera is as follows: The negative is placed in the frame $i$ in front of the object-glass, and the sensitized paper secured upon the appropriate panel and introduced into the proper groove in the camera-box. The negative is then accurately adjusted in the conjugate focus of the lens by means of the rack and pinion at T and the camera-stand placed in a meridian line. The axis of the camera is adjusted to the sun's inclination by means of the hand-wheel $w$, and it is made to follow the apparent motion of the sun through the heavens by means of the cams $l\ l$, by which arrangement the axis of the lens is made to follow the path of the sun by a single motion only. The motion around the polar axis may be given through bevel-gear, or by a tangent-screw, or any other equivalent mechanical means, either by hand or by clockwork, applied in any known manner. This motion is to be maintained until the printing of the picture is completed.

Having thus described my invention, what I claim as new, and desire to secure by Letters Patent, is—

1. A camera-stand constructed with two adjustments at right angles to each other, for the purpose of following the path of the sun by a single motion, substantially as shown and described.

2. The grooves $k\ k$ and $m\ m$, in combination with a rigid camera-box, as shown and described, for the purpose set forth.

3. The double chamber S and D when used to form a rigid camera-box provided with slide-grooves, as shown and described.

HERMAN ROETTGER.

Witnesses:
JAS. A. BRADY,
JOHN WHITE.